United States Patent [19]

Calkins et al.

[11] Patent Number: 4,688,537
[45] Date of Patent: Aug. 25, 1987

[54] APPARATUS FOR PREVENTING FREEZE-UP OF A PRESSURE REGULATOR VALVE IN A LIQUIFIED PETROLEUM FUEL SYSTEM

[76] Inventors: Noel C. Calkins, 844 A 43rd, P.O. Box 416; George E. Perrault, 2077 47th St., both of Los Alamos, N. Mex. 87544

[21] Appl. No.: 928,516

[22] Filed: Nov. 7, 1986

Related U.S. Application Data

[63] Continuation-in-part of Ser. No. 723,465, Apr. 15, 1985, abandoned.

[51] Int. Cl.⁴ .............................................. F02G 5/00
[52] U.S. Cl. .................................. 123/557; 123/523; 123/527; 165/104.19
[58] Field of Search ............... 123/553, 557, 523, 527; 165/104.19

Primary Examiner—E. Rollins Cross

[57] ABSTRACT

An apparatus for preventing freeze-up of a pressure regulator valve in a liquified petroleum fuel system by heating the valve, a fuel expansion chamber and the fuel, after it has been expanded to a gaseous state, to counteract the refrigeration action produced by expansion of the gas at atmospheric pressure. A heat pipe transfers heat from an internal combustion engine to the fuel expansion chamber, regulator valve and fuel. The fuel is heated to a selected temperature in the range of 80° F. to 140° F. The heat pipe can provide structural support to the fuel expansion chamber to facilitate the installation of the fuel conversion system. The heat pipe can comprise a metal pipe or a corrugated metal hose which allows relative movement between the condenser and the evaporator ends of the pipe. Additionally, a heat pipe using a porous wick can be used so that the fuel expansion chamber can be located below the attachment point of the evaporator portion of the heat pipe to the engine.

8 Claims, 6 Drawing Figures

APPARATUS FOR PREVENTING FREEZE-UP OF A PRESSURE REGULATOR VALVE IN A LIQUIFIED PETROLEUM FUEL SYSTEM

BACKGROUND OF THE INVENTION

This application is a Continuation-In-Part of application Ser. No. 723,465 filed Apr. 15, 1985, now abandoned. The present invention pertains generally to liquified petroleum fuel internal combustion engines and, more particularly, to structures for preventing freeze-up of a pressure regulator valve in a liquified petroleum fuel system and for controlling the temperature of the liquified petroleum fuel in a gaseous state for combustion.

Internal combustion engines powered by combustible petroleum gas are widely used. While such engines typically use gasoline as a fuel, it is well known that internal combustion engines may readily be converted to use petroleum fuels which are not liquid at or near room temperature and pressure. An example of such a fuel is LPG (liquified petroleum gas) which comprises a mixture of hydrocarbons such as methane, ethane, propane and butane. These fuels are gases or vapors at engine inlet pressures and temperatures. Such fuels are frequently stored under pressure in tanks in a liquid state at high pressures prior to expansion to a gaseous state for combustion.

The conversion of liquified petroleum fuels such as liquified propane, compressed natural gas (CNG) or mixtures of CNG and LPG to vapor by pressure reduction and expansion for purposes of carburetion results in a significant refrigerant action which can cause fuel handling devices to quickly "ice up" and freeze unless heat is added. This problem may be controlled by converting liquid propane to a vapor in a heat exchanger wherein heat is applied to the fuel handling device by heated coolant liquid used for cooling the internal combustion engine. However, the amount of heat supplied to the exchanger by constant circulation of engine coolant liquid through the heat exchanger is highly variable and depends upon a wide variety of factors such as the engine RPM, load, engine thermostat, water pump, speed, ambient temperature, ventilation, emission controls, and the time required from start-up to reach the desired coolant liquid operating temperature for the engine. Any substantial variation in the amount of heat supplied to the heat exchanger for vaporizing the liquid propane can result in a significant change in the expansion rate of the propane as it vaporizes. This change results in large variations in the fuel/air mixture ratio in the carburetor, i.e. a fuel/air mixture that may be either too lean or too rich for the desired operating condition.

Some engine water temperatures may run as high as 212° F. Any temperatures exceeding 140° F. can distill solids from the fuel causing gummy residues to collect in the propane converter/regulator and in the propane carburetor which restricts gas flow and softens elastomeric seals, necessitating dismantling and cleaning of the fuel handling system.

These disadvantages and limitations have been overcome by devices such as that disclosed in U.S. Pat. No. 3,378,063, issued Apr. 16, 1968, to Mefferd. The Mefferd device controls or regulates the flow of engine coolant through a heat exchanger with a thermostatic control valve. The Mefferd device uses a cage valve to control the flow of fluid. The valve is not selfcleaning and it is expensive to manufacture. These problems have been overcome by a device disclosed in U.S. Pat. No. 4,359,972, issued Nov. 23, 1982, to Calkins, which discloses an inexpensive self-cleaning control device.

Although such devices are capable of controlling the temperature produced in the heat exchanger by controlling the flow of fluid, several disadvantages and limitations attend the use of such systems. For example, installation time is increased because of the time required to tap the engine water jacket circulation system. Moreover, the potential danger of loss of engine jacket coolant due to leakage is substantially increased by installation of such systems. Additionally, it is important to provide heat as quickly as possible to fuel handling devices to prevent freezing. Engine jacket coolant takes a substantial period of time to obtain a suitable temperature for providing heat to the heat exchanger. Consequently, performance of the propane powered engine is adversely affected for a substantial period of time during start-up conditions. Also, the moving parts required in control valves can jam or stick causing the system to malfunction. Additionally, tapping of the engine jacket coolant circulation system in an automobile frequently interferes with the operation of the automobile heater. Locational requirements of the heat exchanger limit placement within the engine compartment so as to further increase the complexity, expense and inconvenience of installation.

U.S. Pat. No. 3,763,838, issued Oct. 9, 1973, to Lindsay et al., U.S. Pat. No. 3,935,849, issued Feb. 3, 1976, to Mills, U.S. Pat. No. 3,977,378, issued Aug. 31, 1976, to Harned, and U.S. Pat. No. 3,927,651 issued Dec. 23, 1975, to Harrow et al., all disclose the use of heat pipes or heat pipe type devices for transferring heat from an internal combustion engine to a carburetor to vaporize gasoline fuel prior to combustion. Each of these patents is hereby specifically incorporated herein by reference for all that they disclose. Unlike liquified petroleum fuel, which exists in a gaseous state at room temperature, gasoline must be heated to a temperature of about 350°–450° F. to be vaporized. The heat pipes disclosed in these patents are used to raise the gasoline's temperature above its vaporization temperature to provide a vaporized fuel for better combustion. A heat pipe is used in the present invention, however, to add heat to a fuel expansion chamber and a pressure regulator valve to prevent freeze-up of the valve and to heat the liquified petroleum fuel, which already exists in a gaseous state, to a predetermined temperature which produces a predetermined expansion of the liquified petroleum fuel so that it can be mixed in the proper proportions within the propane carburetor. Not only does the liquified petroleum fuel have to be heated above a predetermined minimum temperature of about 80° F. to produce the required expansion of the fuel, the temperature also must be maintained below a predetermined maximum temperature of about 140° F. to prevent distilling of the fuel. The heat pipes utilized in the above referenced patents are merely used to produce temperatures above a predetermined minimum temperature sufficient to vaporize the gasoline since gasoline will not distill and form gummy residues within the temperature operating range of heat supplied by the heat pipe. Consequently, the purpose of the present invention, unlike those patents, is to provide a specified predetermined temperature to allow precise control of the expansion of liquified petroleum gas for proper mixture and combustion, and the addition of heat to the fuel chamber and valve to counteract the refrigeration action produced by expansion of the gas.

U.S. Pat. No. 4,430,978 issued Feb. 14, 1984, to Lewis et al. dicloses a fuel injector for injecting liquified petroleum gas into an air/fuel mixing chamber. A heat pipe is used to temperature stabilize the fuel injector with a fuel storage tank by using the storage tank as a heat sink or heat source.

SUMMARY OF THE INVENTION

One object of the present invention is to provide an improved liquified petroleum fuel conversion system.

Another object of the present invention is to prevent freeze-up of a pressure regulator valve in a liquified petroleum fuel system.

Still another object of the present invention is to provide an apparatus for supplying heat to liquified petroleum fuel which has been expanded to a gaseous state to to maintain its temperature in the range of approximately 80° F. to 140° F.

Yet another object of the present invention is to provide an apparatus for maintaining a predetermined temperature in the range of approximately 80° F. to 140° F. in a propane fuel vaporizer from heat supplied by exhaust gases of an internal combustion engine.

To achieve the foregoing and other objects, and in accordance with the purposes of the present invention, as embodied and broadly described herein there is provided an apparatus for preventing freeze-up of a pressure regulator valve in a liquified petroleum fuel system by heating the valve and by heating liquified petroleum fuel which has been expanded to a gas, to a selected temperature in the range of approximately 80° F. to 140° F. The apparatus comprises an internal combustion engine for providing a source of heat and a fuel expansion chamber for holding the liquified petroleum fuel during expansion to a gaseous state. A heat pipe is coupled to the internal combustion engine and to the fuel expansion chamber for transfering heat from the internal combusiton engine to the fuel expansion chamber and pressure regulator valve in an amount sufficient to maintain the fuel at the selected temperature in the predetermined temperature range of 80° F. to 140° F. after the fuel is expanded to a gaseous state. A working fluid is disposed in the heat pipe for transtering heat from the internal combusion engine to the fuel expansion chamber and regulator valve. The working fluid has a latent heat of vaporization and is provided in a quantity sufficient to maintain the selected temperature of the fuel in the temperature range of 80° F. to 140° F. Preferably the heat pipe is connected to the exhaust manifold of the internal combustion engine.

One advantage of the present invention is that it prevents freeze-up of the pressure regulator valve.

Another advantage of the invention is that the fuel expansion chamber, pressure regulator valve and fuel are heated very quickly after starting the engine.

Still another advantage of the invention is that the engine cooling jacket need not be tapped as a source of heat.

Yet another advantage of the invention is that it is easy to install.

Another advantage of the invention is that the fuel expansion chamber can be positioned above, below or even with the connection between the heat pipe and the engine.

Additional objects, advantages and novel features of the invention will be set forth in part in the description which follows and will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and form a part of the specification, illustrate several embodiments of the present invention and together with the description, serve to explain the principles of the invention. In the drawings.

DETAILED DESCRIPTION OF THE INVENTION

Figure 1:
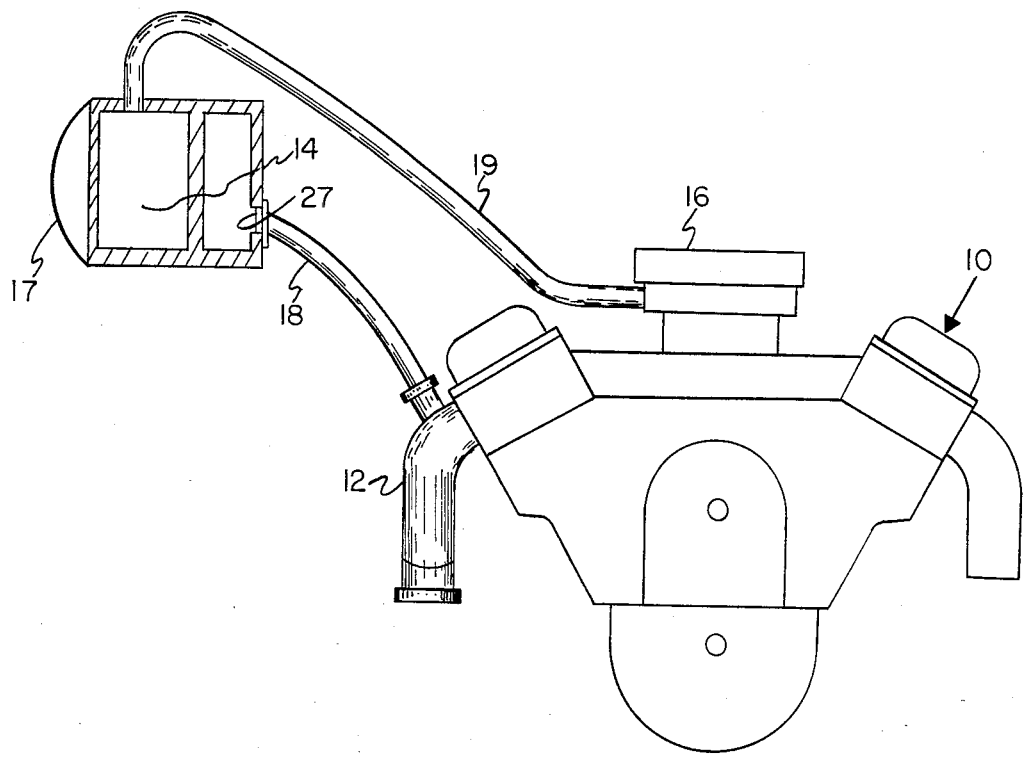
FIG. 1 shows a schematic view of a preferred embodiment of the present invention.

Reference is now made to FIG. 1 which shows a schematic view of a preferred embodiment of the invention. A typical internal combustion 10 has an exhaust manifold 12 which is heated by exhaust gases produced during combustion in internal combustion engine 10. Exhaust manifold 12 is heated to a high temperature in a very rapid manner and is the single best source of rapid and high temperature heat available from internal combustion engine 10. Fuel expansion chamber 14 comprises a portion of the fuel handling means of a liquified petroleum fuel conversion system utilized in conjunction with the present invention. Fuel expansion chamber 14 is coupled to the output of a pressure regulator valve 17 which is, in turn, connected to a pressurized source of liquified petroleum fuel (not shown). The liquified petroleum fuel passed through the pressure regulator valve 17 and expands to a regulated pressure in fuel expansion chamber 14. The expanded liquified petroleum fuel, which is in a gaseous state, is supplied to propane carburetor 16 which mixes the gaseous fuel with air for combustion. The liquified petroleum fuel, which is in a gaseous state, is channeled to propane carburetor 16 by way of additional fuel handling means 19. The present invention is an improved apparatus for preventing freeze-up of a pressure regulator valve 17 in a liquified petroleum fuel system by heating the valve 17 and by heating liquified petroleum fuel, that is expanded to a gas, to a selected temperature in the range of 80° F. to 140° F. The liquified petroleum fuel can be any dry gas such as LPG or CNG, or a mixture of such dry gases.

During the expansion of the liquified petroleum fuel from a liquified state under high pressure to a gaseous state under atmospheric pressure in fuel expansion chamber 14, a considerable amount of heat is absorbed by the fuel. This results in a refrigeration action which cools fuel expansion chamber 14 and pressure regulator valve 17. If pressure regulator valve 17 freezes up, fuel can not enter fuel expansion chamber 14 and carburetor 16. Without the addition of heat to fuel expansion chamber 14, the temperature of fuel expansion chamber 14 is substantially reduced and consequently the fuel is not expanded to a sufficient volume for mixing with air in carburetor 16. Additionally, the variation of temperature in fuel expansion chamber 14 causes a large variation in the expansion of the fuel resulting in a variation of density of fuel and hence a variation of air/fuel ratio.

To obtain consistent and uniform combustion, the fuel must be held at a uniform and specified temperature to provide consistent expansion within fuel expansion chamber 14. Temperatures within the range of 80° F. to 140° F. provide sufficient expansion without distilling the fuel. At temperatures above 140° F., the fuel has a tendency to distill and produce gummy residues which necessitates disassembly and cleaning of the fuel handling system, including fuel expansion chamber 14 and carburetor 16. Accumulation of gummy residues resulting from distilling of fuel at temperatures above 140° F. can cause malfunctioning and clogging of the fuel handling system.

To provide a specified uniform temperature in the range of 80° F. to 140° F., the present invention uses a heat pipe 18 which is preferably coupled to exhaust manifold 12 and the fuel expansion chamber 14. As illustrated in FIG. 1, heat pipe 18 serves as a support for the fuel handling means, specifically fuel expansion chamber 14. Consequently, the amount of work required to install a liquified petroleum fuel conversion system is reduced.

Heat pipes, such as heat pipe 18, were first developed at the Los Alamos National Laboratory in 1963 for space power applications. Their primary function is for use in special heat transfer applications. Heat pipes have been used for permafrost control for the Alaska Pipeline, waste heat recovery, temperature control for radiation experiments in reactors, space vehicles, heat transfer in electronic equipment, and in solar collection systems. Heat pipes have primarily been used where high heat transfer rates are required or precise temperature control of a process or device is needed.

Heat pipes are extremely efficient devices for transferring heat. During heat transfer by conduction, energy is transferred by motion of atoms and electrons within the heat-conducting material. Metals have a high thermal conductivity because of their molecular structure. Pure silver has the highest known thermal conductivity of all metals. Heat pipes have a thermal conductivity about three orders of magnitude greater than the thermal conductivity of silver.

A unique feature of a heat pipe is that it can maintain a constant temperature which is independent of the amount of heat transfered to the heat pipe. Consequently, heat pipe 18 can be designed to provide a specified temperature within the range of 80° F. to 140° F. and maintain the fuel in a gaseous state in fuel expansion chamber 14, regardless of the magnitude of the refrigeration action caused by the expansion of the gas, as long as a sufficient amount of heat is supplied by exhaust manifold 12. Consequently, heat pipe 18 acts as a temperature control device which is capable of automatically varying the amount of heat supplied to the fuel handling means to maintain a specified temperature.

Figure 2:
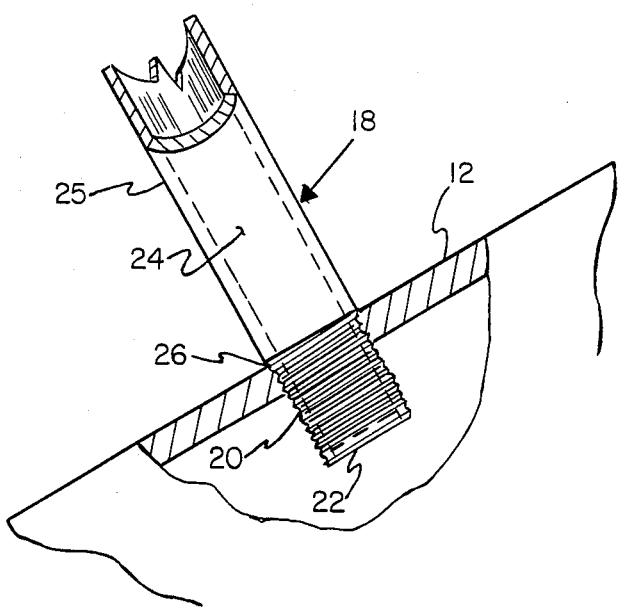
FIG. 2 shows a detailed cutaway view of the manner of mounting the heat pipe of the present invention.

FIG. 2 illustrates a cutaway view of heat pipe 18 which is mounted in exhaust manifold 12 by threaded end portion 20. Heat pipe 18 comprises an elongated, hermetically sealed enclosure which provides an air-tight cavity 24 in which a working fluid (not shown) is disposed. In accordance with the present invention, the elongated enclosure is formed from a metallic pipe 25 such as is shown in FIG. 2. The metallic pipe 25 has a threaded end portion 20 and a plug portion 22 to provide an air-tight seal for air-tight cavity 24.

In operation, the working fluid circulates between an evaporator portion 26, the heated region of the heat pipe 18, and a condenser portion 27, the heat loss portion of heat pipe 18. Condenser portion 27 is shown in FIG. 1 and is located in fuel expansion chamber 14. Heat is absorbed by the working fluid in the evaporator portion 26 and vaporized. The amount of energy required to vaporize a given quantity of liquid is defined as the latent heat of vaporization. The amount of energy transferred by heat pipe 18 is proportional to the latent heat of vaporization.

The vaporized working fluid flows from evaporator portion 26 to the condenser portion 27 located in the fuel expansion chamber 14. The refrigerant action of the expanded fuel in fuel expansion chamber 14 cools the condenser portion 27 of heat pipe 18. Cooling of condenser portion 27 causes the working fluid to condense in condenser portion 27 and form a liquid which flows by gravity to the evaporator portion 26 of heat pipe 18. Approximately the same amount of heat that was absorbed in the evaporator portion 26 to vaporize the working fluid is released in the condenser portion 27 of heat pipe 18.

Both evaporator portion 26 and condenser portion 27 operate at approximately the same temperature so that heat is transferred between them at a nearly constant temperature. Although fluid circulates within heat pipe 18, it has no moving parts. Consequently, heat pipe 18 can supply varying amounts of heat to maintain a selected operating temperature within fuel expansion chamber 14 in accordance with the amount of heat required to maintain that selected temperature.

In order to establish a selected operating temperature for heat pipe 18, both the type and amount of working fluid, as well as its operating conditons must be specifically designed for the particular application utilized. In accordance with the present invention, a mixture of alcohol and water is preferably used as the working fluid which is contained within the heat pipe 18. Water has a latent heat of vaporization of approximately 2,492 joules per gram while methanol has a latent heat of vaporization of approximately 1,178 joules per gram. In the preferred embodiment, a mixture of approximately 50% water and 50% alcohol is used as the working fluid. A sufficient amount of working fluid is added to heat pipe 18 so it can transfer heat between evaporator section 26 and condenser section 27. The heat pipe 18 is then heated to the desired operating temperature, e.g., 140° F. and any pressure produced within air-tight cavity 24 is released so that atmospheric pressure exists within cavity 24 at an operating temperature of 140° F. Since heat pipe 18 does not function properly at pressures at or near atmospheric pressure, but requires a partial vacuum for proper operation, the maximum operating temperature is established by setting the pressure within cavity 24 at the maximum operating temperature. The amount of working fluid is then adjusted to obtain a suitable operating temperature within the range of 80° F. to 140° F. on a trial-and-error basis. Alternatively, the percentage mixture of water and alcohol can be adjusted to obtain a proper operating temperature on a trial-and-error basis.

After a proper operating temperature has been achieved, both the percentage mixture and quantity of working fluid is carefully measured for the particular heat pipe 18 used. This quantity and mixture of fluid can then be used in similar heat pipes 18 to produce approximately the same operating temperature within a few degrees. Consequently, once the mixture and quantity of working fluid is established, this information can be used in a production line process for filling heat pipes 18 which operate at a specified temperature, plus or minus a few degrees.

Figure 3:
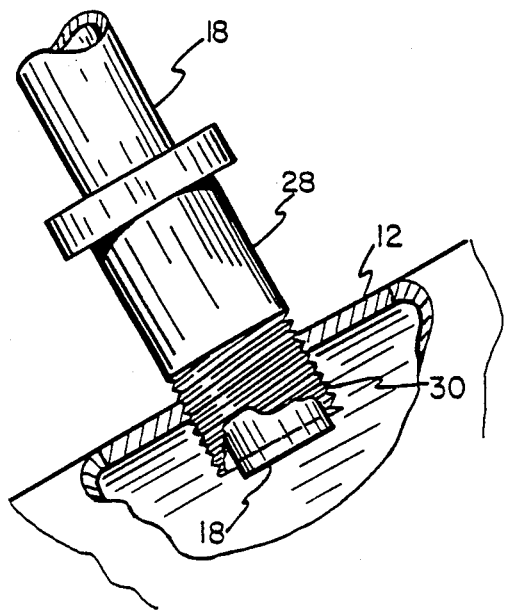
FIG. 3 shows a detailed cutaway view of a connecting device for a heat pipe of the present invention.

FIG. 3 shows an alternative manner of mounting heat pipe 18 within manifold 12. As illustrated in FIG. 3, a coupling device 28 having a threaded portion 30 is used to provide a mounting support for heat pipe 18. Heat pipe 18 can be friction-fitted, heat-fitted, welded or brazed to coupling device 28 after insertion through a central opening (not shown) in coupling device 28. Coupling device 28 provides sufficient support for heat pipe 18 so that heat pipe 18 can support the fuel expansion chamber 14 shown in FIG. 1.

Figure 4:
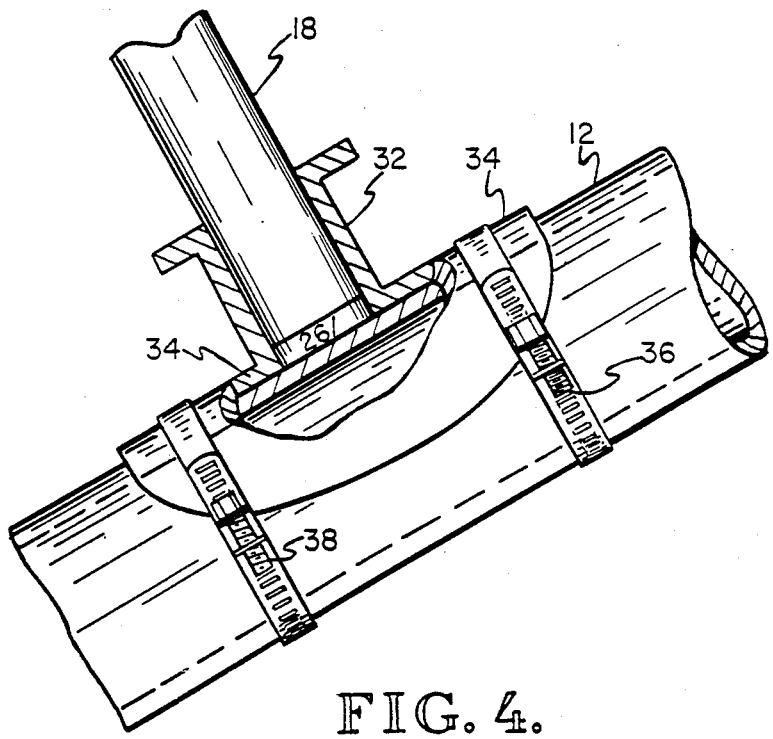
FIG. 4 shows a partial cross-sectional view of an additional connecting device for the heat pipe of the present invention.

FIG. 4 shows a partial cross-sectional view of an additional manner of connecting heat pipe 18 to manifold 12. FIG. 4 shows a coupling device 32 having a flange portion 34 adapted to couple with the curved surface of manifold 12. Flange portion 34 has a surface area which is sufficiently large to provide adequate heat transfer between manifold 12 and heat pipe 18. Additionally, flange 34 is sufficiently large to provide adequate contact with heat pipe 18 to support the fuel handling means including fuel expansion chamber 14 shown in FIG. 1. Coupling device 32 is attached to manifold 12 by way of connecting straps 36, 38 which hold flange 32 against the surface of manifold 12. Heat pipe 18 is fit in a central opening in coupling device 32 such that the end of evaporator portion 26 is abutted against the surface of manifold 12. Heat is transferred from manifold 12 to the evaporator portion 26 across their contacting surfaces. An advantage of the embodiment illustrated in FIG. 4 is that tapping of exhaust manifold 12 is not required.

Figure 5:
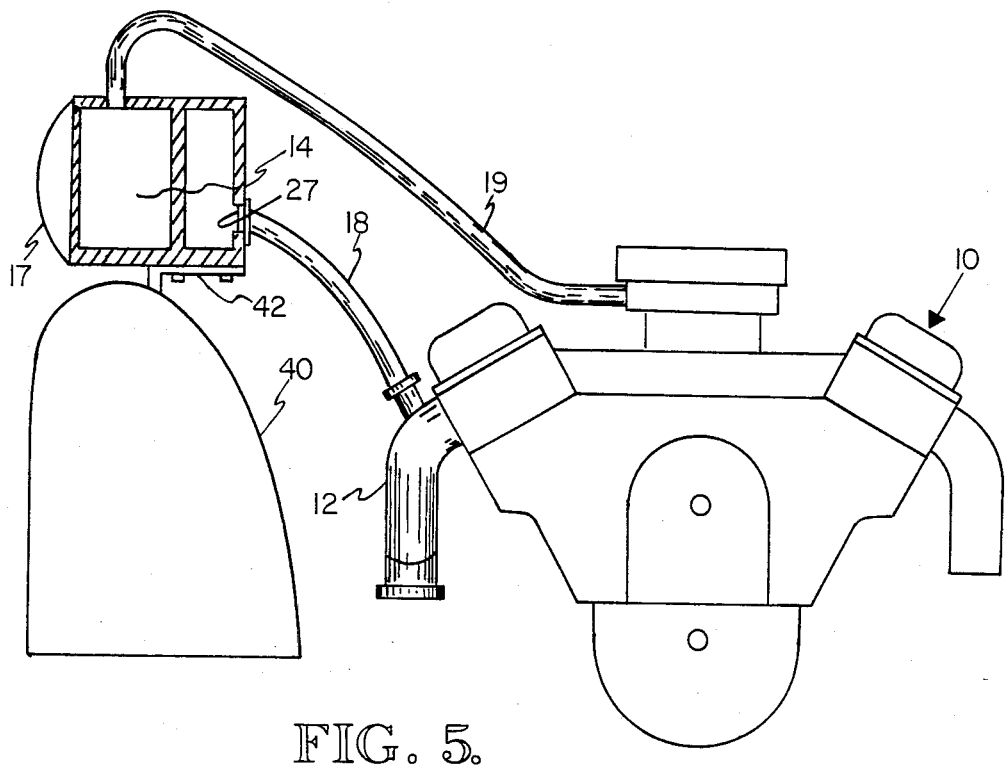
FIG. 5 shows a schematic view of an additional embodiment of the present invention.

FIG. 5 shows a schematic view of an additional embodiment of the present invention. As illustrated in FIG. 5, fuel expansion chamber 14 and other interconnecting fuel handling means are supported on the interior portion of the engine compartment such as on wheel well 40 by way of bracket 42. Since heat pipe 18 does not provide structural support for fuel expansion chamber 14 in this embodiment of the invention, heat pipe 18 can comprise a corrugated metal hose which is flexible and allows easier interconnection between manifold 12 and fuel expansion chamber 14. The corrugated metal hose will also allow movement of the engine 10 relative to the stationarily mounted fuel expansion chamber 14. The corrugated metal hose has the advantage of providing an air-tight cavity which is capable of operating as a heat pipe 18 while maintaining flexibility between two relatively moving objects. An advantage of the system illustrated in FIG. 5 is that the coupling connection between heat pipe 18 and exhaust manifold 12 does not have to provide structural support for fuel expansion chamber 14.

Figure 6:
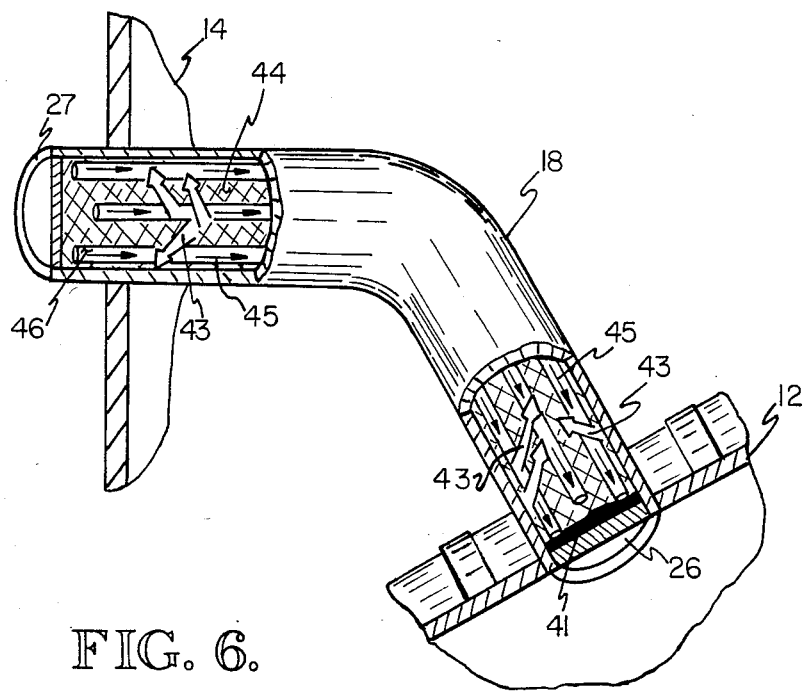
FIG. 6 shows a detailed cutaway view of a heat pipe which can be used in conjunction with the present invention.

FIG. 6 shows a detailed cutaway view of a heat pipe 18 which is suitable for use in the present invention and does not require a vertical orientation for proper operation. As illustrated in FIG. 6, heat pipe 18 has a condenser portion 27, which is located within the interior of fuel expansion chamber 14. The evaporator portion 26 of heat pipe 18 is located adjacent to exhaust manifold 12. A wick 44 is disposed along the interior surface of heat pipe 18. Working fluid 41 is vaporized at evaporator portion 26 and moves, as shown by large arrows 43, to condenser portion 27 where it condenses. The liquid working fluid 41 of the heat pipe 18 is pumped back to the evaporator portion 26 by capilary action causing the condensed working fluid 41 to migrate from condenser portion 27 to evaporator portion 26 as shown by small arros 45.

The wick 44 can be fabricated with many different structural designs to return the working fluid 41 to the evaporator portion 26. As illustrated in FIG. 6, a series of arteries 46 can be included as a portion of wick 44 to increase the flow of working fluid 41 and thereby enhance the operational capabilities of heat pipe 18. A heat pipe 18 with a wick 44 as shown in FIG. 6 can be used to mount fuel expansion chamber 14 level with or lower than the juncture of evaporator portion 26 and exhaust manifold 12. This ability provides even greater versatility and ease of installation of the propane fuel conversion system. It is known to those skilled in the art, as mentioned in U.S. Pat. No. 4,336,837 to Koenig which is expressly incorporated by reference for all that it teaches, that the evaporator portion of a heat pipe having a wick can be located as much as one meter higher than the condenser portion. The wick returns the condensed working fluid to the evaporator portion by capillary action to overcome gravity.

Consequently, the present invention provides a liquified petroleum fuel conversion system which prevents freeze-up of a pressure regulator valve 17 and which is capable of controlling the temperature of the gaseous fuel in a precise manner through the use of a heat pipe 18. A varying amount of heat is supplied to the fuel expansion chamber 14 and pressure regulator valve 17 to counteract the cooling caused by expansion of the liquified petroleum fuel to atmospheric pressure and to additionally add heat to the fuel to cause a predetermined expansion of the fuel which is suitable for combustion in a propane carburetor 16. The heat pipe 18 can be used to provide structural support for the fuel expansion chamber 14 to aid in the installation of the liquified petroleum conversion system. Due to the high heat transfer rate of the heat pipe 18, the gaseous liquified petroleum fuel is quickly heated in fuel expansion chamber 14 to a selected temperature which provides the proper expansion of the gas for combustion.

The foregoing description of several embodimenst of the invention has been presented for purposes of illustration and description. It is not intended to be exhaustive or to limit the invention to the precise forms disclosed. They were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for preventing freeze-up of a pressure regulator valve in a liquified petroleum fuel system by heating the valve and by heating liquified petroleum fuel, that is expanded to a gas, to a selected temperature in the range of approximately 80° F. to 140° F. comprising:

a. an internal combustion engine for providing a source of heat;

b. a fuel expansion chamber for holding the liquified petroleum fuel during expansion to a gaseous state;

c. a heat pipe coupled to said internal combustion engine and to said fuel expansion chamber for transferring heat from said internal combustion engine to the regulator valve and to said fuel expansion chamber in an amount sufficient to maintain the fuel at a selected temperature in the temperature range of 80° F. to 140° F. after the fuel has expanded to a gaseous state; and d. a working fluid disposed in said heat pipe for transferring heat from said internal combustion engine to the regulator valve and to said fuel expansion chamber, said working fluid having a latent heat of vaporization and being provided in a quantity sufficient to maintain the selected temperature of the fuel in the temperature range of 80° F. to 140° F.

2. The apparatus of claim 1 wherein said working fluid comprises a mixture of alcohol and water.

3. The apparatus of claim 1 wherein said heat pipe comprises a metal pipe.

4. The apparatus of claim 3 wherein said heat pipe has threaded end portions for coupling to said internal combustion engine and to said fuel expansion chamber so that said fuel expansion chamber is supported by said heat pipe.

5. The apparatus of claim 1 wherein said working fluid is disposed in said heat pipe at a partial atmospheric pressure such that a pressure of less than one atmosphere is maintained in said heat pipe during operation of said apparatus.

6. The apparatus of claim 1 wherein said heat pipe includes a wick.

7. The apparatus of claim 6 wherein said fuel expansion chamber is located gravitationally beneath said heat supply means.

8. The apparatus of claim 3 further comprising a flange coupled to said heat pipe for supporting said heat pipe, said flange having a surface area of sufficient size and having a sufficiently high coefficient of thermal conductivity to conduct a sufficient quantity of heat to said fuel expansion chamber to maintain the fuel in the temperature range of 80° F. to 140° F.

* * * * *